(12) United States Patent
Ji et al.

(10) Patent No.: US 10,954,855 B1
(45) Date of Patent: Mar. 23, 2021

(54) AIR INTAKE AND EXHAUST SYSTEM OF TURBINE ENGINE

(71) Applicant: AMERICAN JEREH INTERNATIONAL CORPORATION, Houston, TX (US)

(72) Inventors: Xiaolei Ji, Yantai (CN); Rikui Zhang, Yantai (CN); Peng Zhang, Yantai (CN); Mingchao Mao, Yantai (CN); Zhuqing Mao, Yantai (CN); Jihua Wang, Yantai (CN); Jianwei Wang, Yantai (CN)

(73) Assignee: American Jereh International Corporation, Houston, TX (US)

( * ) Notice: Subject to any disclaimer, the term of this patent is extended or adjusted under 35 U.S.C. 154(b) by 0 days.

(21) Appl. No.: 16/816,259

(22) Filed: Mar. 12, 2020

(51) Int. Cl.
*F02C 7/052* (2006.01)
*F01D 25/30* (2006.01)
*F02C 7/00* (2006.01)

(52) U.S. Cl.
CPC ............. *F02C 7/052* (2013.01); *F01D 25/30* (2013.01); *F02C 7/00* (2013.01); *F05D 2260/607* (2013.01); *F05D 2260/96* (2013.01)

(58) Field of Classification Search
CPC .... F02C 7/052; F02C 7/00; F02C 7/04; F05D 2260/607; F05D 2250/50; F05D 2250/52
See application file for complete search history.

(56) References Cited

U.S. PATENT DOCUMENTS

| | | | | |
|---|---|---|---|---|
| 3,418,485 A * | 12/1968 | Anderson | ............... | F01D 15/10 290/1 R |
| 3,791,682 A * | 2/1974 | Mitchell | ................ | F01D 15/10 290/2 |
| 9,590,472 B2 * | 3/2017 | Davies | ..................... | F02C 7/12 |
| 2003/0072648 A1 * | 4/2003 | Han | ....................... | F01D 25/30 415/119 |
| 2012/0117930 A1 * | 5/2012 | Nicholas | ................ | F02C 7/052 55/495 |
| 2013/0333567 A1 * | 12/2013 | Kulkarni | .............. | F24F 3/1603 96/2 |

* cited by examiner

*Primary Examiner* — Steven M Sutherland

(57) ABSTRACT

The present invention discloses an air intake and exhaust system of a turbine engine, including an air intake system and an exhaust system. The air intake system is connected to an air inlet of the turbine engine, and the exhaust system is connected to an exhaust port of the turbine engine. The air intake system includes air intake filters and air intake pipings, which are connected to each other. The air intake filters are in V-shaped structures. The exhaust end of the exhaust system is provided with a rain cap. The beneficial effects are as follows: the air intake area is large, the flow rate of the air intake is relatively low, and the air filter has a long life time. The exhaust port is additionally provided with the rain cap, preventing rainwater from accumulating in an exhaust silencer and thus preventing rainwater from possibly flowing backward into and damaging the turbine engine; the opening of the rain cap faces away from the air inlet, preventing the discharged exhaust from being inhaled by the air inlet, and ensuring the quality of air inflow.

10 Claims, 1 Drawing Sheet

AIR INTAKE AND EXHAUST SYSTEM OF TURBINE ENGINE

TECHNICAL FIELD

The present invention relates to the technical field of turbine fracturing, and specifically to an air intake and exhaust system of a turbine engine.

BACKGROUND

Currently, power systems for fracturing equipment in oil and gas fields around the world mainly include: diesel engines and electric motors. With the current oil and gas exploitation environment changes, well sites are getting smaller, and the roads to well sites are becoming more and more rugged. For economic reasons, mining costs need to be continuously reduced, including equipment investment costs, equipment maintenance costs, fuel costs, and so on.

However, diesel engines have disadvantages of large volumes and heavy weights, exhaust pollution and noise pollution, high fuel costs, and limited access of electric motors to the power grid, making the new trend of turbine engines become very popular. Turbine engines rely on energies released from the combustion of air provided by the air intake system with fuels (wellsite natural gas) for work. Turbine engines have very high requirements on the air intake and exhaust system. The reasonable performances of the air intake and exhaust system of turbine fracturing equipment may affect the operating status of turbine engines, and in turn affect the whole operation progress at fracturing fields. On the one hand, turbine engines have very high air intake demand, which is several times that of an ordinary diesel engine. The air intake area of the existing turbine engine is relatively small. To meet the air intake demand of a turbine engine, due to the small air intake area, the air intake flow rate has to be high. Due to the presence of many solid suspended particles and silicon dust in the air, the life time of the air filter at the air inlet would be reduced. On the other hand, turbine engines would produce very loud noise during working. Therefore, an exhaust silencer is required to reduce noise. However, as limited by the height requirements for vehicle-mounted devices, the exhaust silencer is usually designed so that the exhaust port and the air inlet have equal horizontal heights. Although such a measure meets the height requirement for vehicle's on board device, the exhaust discharged from the exhaust port can be easily inhaled by the air inlet, thus influencing the oxygen content of air inflow and the like. In addition, the exhaust silencer at the exhaust port is open. If it rains, rainwater would accumulate in the exhaust silencer, and more seriously, rainwater would flow backward into the turbine engine and damage the turbine engine.

Therefore, an air intake and exhaust system of a turbine engine is urgently needed to resolve the air intake and exhaust problems, and provide favorable conditions for normal working of the turbine engine.

SUMMARY

To overcome the deficiencies in the prior art, an objective of the present invention is to provide an air intake and exhaust system of a turbine engine, in which air intake filters are designed in V-shaped structures, so that the air intake area is increased, the air intake flow rate is reduced while meeting the large air intake demand of the turbine engine, avoiding damages to the air filters caused by floating dust and particles in the air, and extending the life time of the air filters. The exhaust port is additionally provided with a rain cap to prevent rainwater from accumulating in an exhaust silencer while meeting the height requirements for vehicle-mounted devices and therefore preventing rainwater from possibly flowing backward into and damaging the turbine engine. The opening of the rain cap faces away from the air inlet, preventing the discharged exhaust from being inhaled by the air inlet, and ensuring the quality of air inflow.

The objective of the present invention is achieved by the following technical measures: an air intake and exhaust system of a turbine engine, including an air intake system and an exhaust system. The air intake system is connected to an air inlet of the turbine engine, and the exhaust system is connected to an exhaust port of the turbine engine. The air intake system includes air intake filters and air intake pipings, which are connected to each other, the air intake filters are in V-shaped structures, and the exhaust end of the exhaust system is provided with a rain cap.

Further, the air intake pipings employ steel wire wound bellows.

Further, the exhaust system includes an exhaust silencer, a bellows, and a flow guide tube, which are connected in succession, another end of the flow guide tube is connected to the exhaust port of the turbine engine, another end of the exhaust silencer is hinged to the rain cap, and the rain cap may be rotationally opened and closed around the hinge, with the rotation angle greater than or equal to 0° and less than 90°.

Further, the opening-closing angle of the rain cap is 85°.

Further, the rotary opening-closing of the rain cap is achieved through an electric capstan.

Further, the opening of the rain cap faces away from the turbine engine.

Further, the air intake filters are disposed on the side or the top of the turbine engine.

Further, the air intake filters are disposed on the side of the turbine engine in multiple groups, or disposed on the top of the turbine engine in multiple groups.

Compared with the prior art, the present invention has the following beneficial effects: providing an air intake and exhaust system of a turbine engine, in which air intake filters are designed in V-shaped structures, so that the air intake area is increased, an air intake flow rate is reduced while meeting a large air intake demand of the turbine engine, avoiding damages to the air filters caused by floating dust and particles in the air, and extending the life time of the air filters. The exhaust port is additionally provided with a rain cap to prevent rainwater from accumulating in an exhaust silencer while meeting the height requirements of vehicle-mounted devices and therefore preventing rainwater from possibly flowing backward into and damaging the turbine engine. The opening of the rain cap faces away from the air inlet, preventing the discharged exhaust from being inhaled by the air inlet, and ensuring the quality of air inflow. The air intake pipings employ steel wire wound bellows to ensure a smooth air intake channel in case of collapse caused by suction. The rain cap can be opened and closed freely under control of an electric capstan, which provides a simple and convenient operation for free switching between a working state and a non-working state of the exhaust system. The air intake filters are mounted in multiple groups, so that the air intake filters can be mounted and disassembled conveniently.

The present invention will be illustrated in detail below with reference to accompanying drawings and the detailed description.

Wherein, 1. exhaust silencer, 2. rain cap, 3. electric capstan, 4. bellows, 5. flow guide tube, 6. turbine engine, 7. air intake filter, 8. air intake piping, 9. cabin, 10. air inlet of the turbine engine, 11. exhaust port of the turbine engine, and 12. exhaust port of the exhaust system.

DESCRIPTION OF THE EMBODIMENTS

Figure 1:
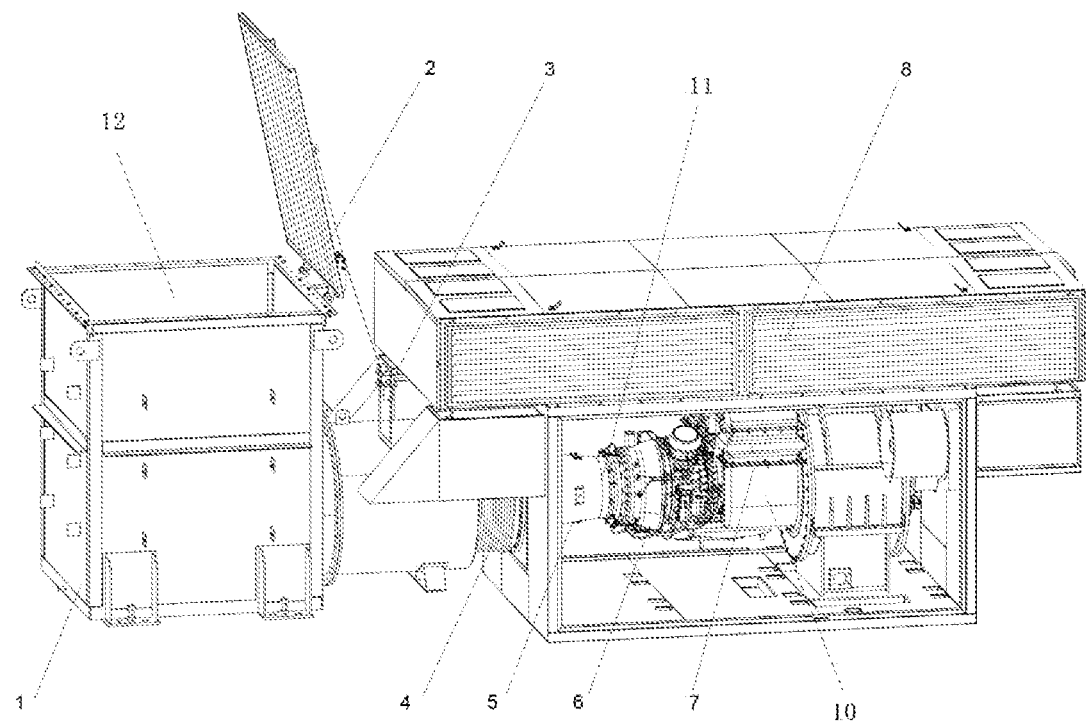
FIG. 1 is a schematic structural diagram of the inventive air intake and exhaust system.
Figure 2:
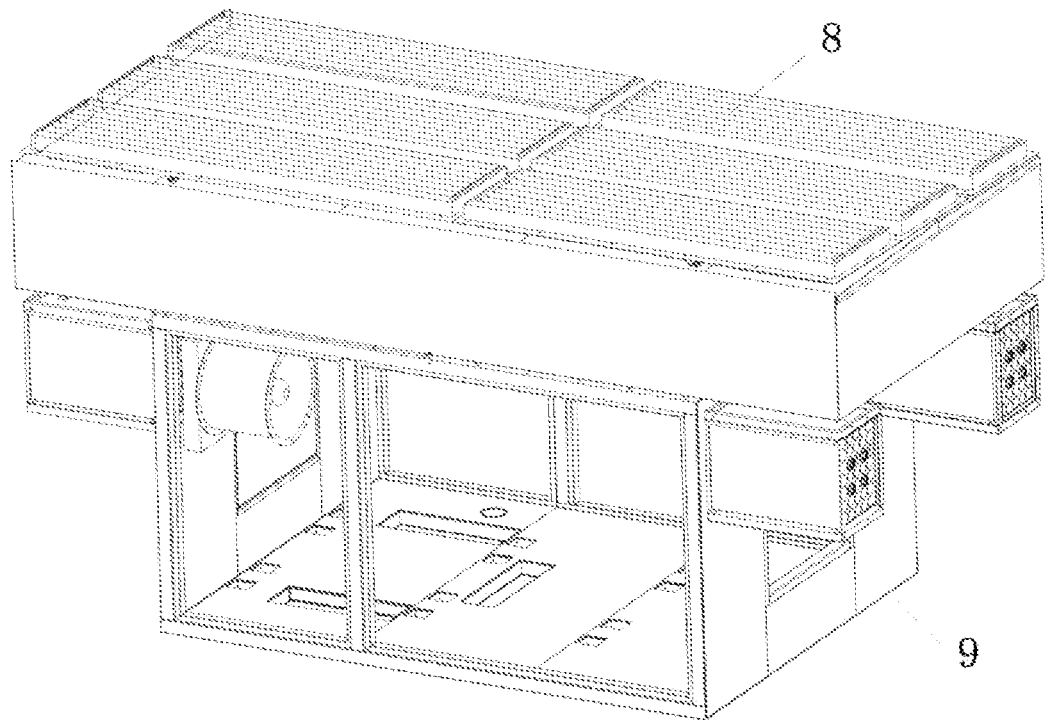
FIG. 2 is a schematic structural diagram of air intake filters mounted on the cabin side of the turbine engine.

As shown in FIGS. 1 and 2, an air intake and exhaust system of a turbine engine includes an air intake system and an exhaust system. The air intake system is connected to an air inlet of the turbine engine 6, and the exhaust system is connected to an exhaust port of the turbine engine 6. The air intake system includes air intake filters 7 and air intake pipings 8, the air intake filters 7 are connected to one end of the air intake pipings 8, another end of the air intake pipings 8 are connected to the air inlet of the turbine engine 6, and the air intake filters 7 are in V-shaped structures. The V-shaped structure, that is, the cross-sectional shapes of the air intake filters 7 are in V-shape, so that the air intake area is increased, the air intake flow rate is reduced while meeting the large air intake demand of the turbine engine 6, avoiding damages to the air filters caused by floating dust and particles in the air, and extending the life time of the air filters. The exhaust port of the exhaust system is additionally provided with a rain cap 2 to prevent rainwater from accumulating in an exhaust silencer 1 while meeting the height requirements for vehicle-mounted devices and therefore preventing rainwater from flowing backward into and damaging the turbine engine 6.

The air intake pipings 8 employ steel wire wound bellows 4 to ensure a smooth air intake channel in case of collapse caused by suction.

The exhaust system includes an exhaust silencer 1, a bellows 4, and a flow guide tube 5, which are connected in succession, another end of the flow guide tube 5 is connected to the exhaust port of the turbine engine 6, another end of the exhaust silencer 1 is hinged to the rain cap 2, and the rain cap 2 may be rotationally opened and closed around the hinge, with the rotation angle greater than or equal to 0° and less than 90°. The opening-closing angle of the rain cap 2 is 85°, less than the opening-closing angle of 90°, aiming to avoid the rain cap 2 from falling towards the side wall of the exhaust silencer 1, and consequently the electric capstan 3 loses control over the rain cap 2.

The rotary opening-closing of the rain cap 2 is achieved through an electric capstan 3. The rain cap 2 can be opened and closed freely under control of the electric capstan 3, which provides a simple and convenient operation for free switching between a working state and a non-working state of the exhaust system.

The opening of the rain cap 2 faces away from the turbine engine 6, to prevent the discharged exhaust from being inhaled by the air inlet, and ensure the quality of air inflow.

In the prior art, the cabin 9 is always disposed outside the turbine engine 6, and the air intake filters 7 are disposed on the side or the top of the cabin 9 of the turbine engine 6. The air intake filters 7 are mounted at flexible positions and can be maintained conveniently.

The air intake filters 7 are disposed on the side of the turbine engine 6 in multiple groups, or disposed on the top of the turbine engine 6 in multiple groups. The air intake filters 7 are mounted in multiple groups, so that the air intake filters 7 can be mounted and disassembled conveniently. Disposing the air intake filters 7 in multiple groups may be: disposing 2 or 3 groups or the like on the left and right sides of the cabin 9 of the turbine engine 6, or disposing 2 or 3 groups or the like on upper and lower sides of the cabin 9 of the turbine engine 6, or evenly disposing 2 or 4 groups or other even-number pairs on the top of the cabin 9 of the turbine engine 6.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof

What is claimed is:

1. An air intake and exhaust system of a turbine engine, comprising an air intake system and an exhaust system, the air intake system is connected to an air inlet of the turbine engine, and the exhaust system is connected to an exhaust port of the turbine engine, wherein the air intake system comprises air intake filters and air intake pipings, which are connected to each other, and an exhaust end of the exhaust system is provided with a rain cap, the rain cap is configured to be opened and closed rotationally so as to open and close the exhaust port of the exhaust system.

2. The air intake and exhaust system of the turbine engine according to claim 1, wherein the air intake pipings employ steel wire wound bellows.

3. The air intake and exhaust system of the turbine engine according to claim 1, wherein the exhaust system comprises an exhaust silencer, a bellows, and a flow guide tube, which are connected in succession, another end of the flow guide tube is connected to the exhaust port of the turbine engine, another end of the exhaust silencer is hinged to the rain cap, and the rain cap may be rotationally opened and closed around the hinge, with the rotation angle greater than or equal to 0° and less than 90°.

4. The air intake and exhaust system of the turbine engine according to claim 3, wherein the opening-closing angle of the rain cap is 85°.

5. The air intake and exhaust system of the turbine engine according to claim 4, wherein the rotary opening-closing of the rain cap is achieved through an electric capstan.

6. The air intake and exhaust system of the turbine engine according to claim 4, wherein the opening of the rain cap faces away from the turbine engine.

7. The air intake and exhaust system of the turbine engine according to claim 3, wherein the rotary opening-closing of the rain cap is achieved through an electric capstan.

8. The air intake and exhaust system of the turbine engine according to claim 3, wherein the opening of the rain cap faces away from the turbine engine.

9. The air intake and exhaust system of the turbine engine according to claim 1, wherein the air intake filter is disposed on the side or the top of the turbine engine.

10. The air intake and exhaust system of the turbine engine according to claim 9, wherein the air intake filters are disposed on the side of the turbine engine in multiple groups, or disposed on the top of the turbine engine in multiple groups.

<p style="text-align:center">* * * * *</p>